US010374239B2

(12) United States Patent
Zhang et al.

(10) Patent No.: US 10,374,239 B2
(45) Date of Patent: Aug. 6, 2019

(54) AQUEOUS PYRIDINIUM CATION-BASED REDOX FLOW BATTERIES (71) Applicant: UCHICAGO ARGONNE, LLC, Chicago, IL (US)

(72) Inventors: Zhengcheng Zhang, Naperville, IL (US); Jinhua Huang, Willowbrook, IL (US); Kevin Gallagher, Downers Grove, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 316 days.

(21) Appl. No.: 15/394,031

(22) Filed: Dec. 29, 2016

(65) Prior Publication Data
US 2018/0191012 A1    Jul. 5, 2018

(51) Int. Cl.
*H01M 8/18* (2006.01)
*H01M 8/04082* (2016.01)
*H01M 4/90* (2006.01)
*H01M 8/04186* (2016.01)

(52) U.S. Cl.
CPC ......... *H01M 8/04201* (2013.01); *H01M 4/90* (2013.01); *H01M 8/04186* (2013.01); *H01M 8/188* (2013.01); *Y02E 60/528* (2013.01)

(58) Field of Classification Search
CPC ............... H01M 8/04201; H01M 4/90; H01M 8/04186; H01M 8/188; Y02E 60/528
See application file for complete search history.

(56) References Cited

U.S. PATENT DOCUMENTS

| | | | |
|---|---|---|---|
| 3,996,064 A | 12/1976 | Thaller | |
| 4,362,791 A | 12/1982 | Kaneko et al. | |
| 5,366,824 A | 11/1994 | Nozaki | |
| 5,709,968 A | 1/1998 | Shimizu | |
| 6,692,862 B1 | 2/2004 | Zocchi | |
| 6,872,376 B2 | 3/2005 | Tanaka et al. | |
| 7,258,947 B2 | 8/2007 | Kubata et al. | |
| 7,320,844 B2 | 1/2008 | Skyllas-Kazacos | |
| 9,300,000 B2 | 3/2016 | Jansen et al. | |
| 2006/0199080 A1 | 9/2006 | Amine et al. | |
| 2006/0263695 A1 | 11/2006 | Dahn et al. | |
| 2007/0092802 A1 | 4/2007 | Ahn et al. | |
| 2008/0241643 A1 | 10/2008 | Lepp et al. | |
| 2009/0017379 A1 | 1/2009 | Inatomi et al. | |
| 2009/0176162 A1 | 7/2009 | Exnar et al. | |
| 2010/0047671 A1 | 2/2010 | Chiang et al. | |
| 2010/0237298 A1 | 9/2010 | Armand et al. | |
| 2010/0297481 A1 | 11/2010 | Son et al. | |
| 2010/0323264 A1 | 12/2010 | Chiang et al. | |
| 2011/0052945 A1* | 3/2011 | Whitacre | H01G 11/06 429/50 |
| 2011/0189549 A1* | 8/2011 | Sun | H01M 6/16 429/338 |
| 2011/0195283 A1 | 8/2011 | Sun et al. | |
| 2011/0200848 A1 | 8/2011 | Chiang et al. | |
| 2011/0294003 A1* | 12/2011 | Zhang | C07C 43/2055 429/199 |
| 2011/0294017 A1 | 12/2011 | Weng et al. | |
| 2012/0135278 A1* | 5/2012 | Yoshie | H01M 8/188 429/7 |
| 2013/0189571 A1 | 7/2013 | Abouimrane et al. | |
| 2015/0372333 A1 | 12/2015 | Odom et al. | |
| 2015/0380760 A1 | 12/2015 | Spaziante et al. | |
| 2016/0013506 A1 | 1/2016 | Dong et al. | |
| 2018/0241065 A1* | 8/2018 | Schubert | H01M 8/188 |

FOREIGN PATENT DOCUMENTS

| | | | |
|---|---|---|---|
| DE | 102015010083 | * | 7/2015 |
| EP | 2001091434 A1 | | 4/2001 |
| WO | 200129920 A1 | | 4/2001 |
| WO | 2011131959 A1 | | 10/2011 |

OTHER PUBLICATIONS

Abraham, K.M. et al., n-Butylferrocene for Overcharge Protection of Secondary Lithium Batteries, Journal of the Electrochemical Society, 137 (6), 1856-1857 (1990).
Amine, K., Develop and Evaluate Materials and Additives That Enhance Thermal and Overcharge Abuse, Department of Energy, (Argonne National Laboratory), Advanced Battery Research Review, Washington, D.C. (2010).
Armand, M. et al., Conjugated Dicarboxylate Anodes for Li-ion Batteries, Nature Materials, 8 (2), 120-125 (2009).

(Continued)

*Primary Examiner* — Alexander Usyatinsky
(74) *Attorney, Agent, or Firm* — Olson & Cepuritis, Ltd.

(57) ABSTRACT

The present invention provides an aqueous redox flow battery comprising a negative electrode immersed in an aqueous liquid negative electrolyte, a positive electrode immersed in an aqueous liquid positive electrolyte, and a cation-permeable separator (e.g., a porous membrane, film, sheet, or panel) between the negative electrolyte from the positive electrolyte. During charging and discharging, the electrolytes are circulated over their respective electrodes. The electrolytes each comprise an electrolyte salt (e.g., a lithium or sodium salt), a redox reactant. The negative redox reactant comprises a pyridinium compound of Formula (I) as described in the specification.

6 Claims, 4 Drawing Sheets

(56) References Cited

OTHER PUBLICATIONS

Behl, W. K. et al., Electrochemical Overcharge Protection of Rechargeable Lithium Batteries, I. Kinetics of Iodide/Tri-Iodide/Iodine Redox Reactions on Platinum LiAsF6/Tetrahydrofuran Solutions, Journal of the Electrochemical Society, 135 (1), 16-21 (1988).
Behl, W. K. et al., Electrochemical Overcharge Protection of Rechargeable Lithium Batteries, II. Effect of Lithium Iodide-Iodine Additives on the Behavior of Lithium Electrode in LiAsF6-Tetrahydrofuran Solutions, Journal of the Electrochemical Society, 135 (1), 21-25 (1988).
Brushett, F.R. et al., An All-Organic Non-Aqueous Lithium-Ion Redox Flow Battery, Advanced Energy Materials, 1-7, (2012).
Buhrmester C. et al., Studies of Aromatic Redox Shuttle Additives for LiFePO4-Based Li-Ion Cells, Journal of the Electrochemical Society, 152 (12) A2390-A2399 (2005).
Chakrabarti, M.H. et al., Evaluation of Electrolytes for Redox Flow Battery Applications, Electrochimica Acta, 52 (5), 2189-2195 (2007).
Chang, D.W. et al., Novel Quinoxaline-Based Organic Sensitizers for Dye-Sensitized Solar Cells, Organic Letters 13 (15), 3880-3883 (2011).
Chen, Z. et al., Redox Shuttles for Safer Lithium-Ion Batteries, Electrochimica Acta, 54 (24), 5605-5613 (2009).
Chen, Z. et al., Lithium Borate Cluster Salts as Redox Shuttles for Overcharge Protection of Lithium-Ion Cells, Electrochemical and Solid State Letters, 13 (4), A39-A42 (2010).
Crabtree, G. et al., Integrating Renewable Electricity on the Grid—A Report by the APS Panel on Public Affairs, American Physical Society, Washington, D.C. (2010).
Duduta, M. et al., Semi-Solid Lithium Rechargeable Flow Battery, Advanced Energy Materials, 1 (4) 511-516 (2011).
Eyer, J. et al., Energy Storage for the Electricity Grid: Benefits and Market Potential Assessment Guide, A Study for the DOE Energy Storage Systems Program, Sandia National Laboratories (2010).
Hu, Bo et al., A Long Cycling Aqueous Organic Redox Flow Battery (AORFB) Towards Sustainable and Safe Energy Storage, Journal of the American Chemical Society, http://pubs.acs.org. Dec. 15, 2016 (pp. 1-10).
Huskinson, Brian et al., A Metal-Free Organic-Inorganic Aqueous Flow Battery, Nature 12909, vol. 505, 195-210, (2014).
Janoschka, Tobias et al., Aqueous Redox-Flow Battery With High Capacity and Power: The TEMPTMA/MV System, Angew. Communications Int. Ed 55, 1-5 (2016).
Kim J.H. et al., Development of Metal-Based Electrodes for Non-aqueous Redox Flow Batteries, Electrochemistry Communication, 13 (9) 997-1000 (2011).
Lee, J.-Y et al., Low Band-Gap Polymers Based on Quinoxaline Derivatives and Fused Thiophene as Donor Materials for High Efficiency Bulk-Heterojunction Photovoltaic Cells, Journal of Materials Chemistry 19 (28), 4938-4945 (2009).

Li, Zhen et al., Electrochemical Properties of an All-Organic Redox Flow Battery Using 2,2,6,6-Tetramethyl-1-Piperidinyloxy and N-Methylphthalimide, Electrochemical and Solid State Letters 14 (12), A171-A173 (2011).
Lin, Kaixiang et al., A Redox-Flow Battery With an Alloxazine-Based Organic Electrolyte, Nature Energy 10.1038, vol. 1, 1-8 (2016).
Lin, Kaixiang et al., Alkaline Quinone Flow Battery, Science, vol. 349 (6255), 1529-1532 (2015).
Liu, Q. et al., Non-aqueous Chromium Acetylacetonate Electrolyte for Redox Flow Batteries, Electrochemistry Communications, 12 (11), 1634-1637 (2010).
Liu, Q. et al., Non-aqueous Vanadium Acetylacetonate Electrolyte for Redox Flow Batteries, Electrochemistry Communications, 11, 2312-2315 (2009).
Matsuda, Y. et al., A Rechargeable Redox Battery Utilizing Ruthenium Complexes with Non-Aqueous Organic Electrolyte, Journal of Applied Electrochemistry, 18 (6), 909-914 (1988).
Matsunaga T. et al., High-Performance Lithium Secondary Batteries Using Cathode Active Materials of Triquinoxalinylenes Exhibiting Six Electron Migration; Chemistry Letters 40 (7), 750-752 (2011).
Moshurchak, L.M. et al., High-Potential Redox Shuttle for Use in Lithium-Ion Batteries, Journal of the Electrochemical Society, 156 (4) A309-A312 (2009).
Pan, Feng et al., Redox Species of Redox Flow Batteries: A Review, Molecules 20, 20499-20517 (2015).
Ponce De Leon, C. et al., Redox Flow Cells for Energy Conversion, Journal of Power Sources, 160 (1), 716-732 (2006).
Sevov, Christo S. et al., Cyclopropenium Salts as Cyclable, High-Potential Catholytes in Nonaqueous Media, Advanced Energy Materials 1602027, 1-5 (2016).
Skyllas-Kazacos M. et al., Progress in Flow Battery Research and Development, Journal of the Electrochemical Society, 158 (8), R55-R79 (2011).
Sleightholme, A. E.S. et al., Non-aqueous Manganese Acetylacetonate Electrolyte for Redox Flow Batteries, Journal of Power Sources, 196 (13), 5742-5745 (2011).
Walker, W. et al., Ethoxycarbonyl-Based Organic Electrode for Li-Batteries, Journal of the American Chemical Society, 132 (18), 6517-6523 (2010).
Walker, W. et al., Electrochemical Characterization of Lithium 4,4'-tolane-dicarboxylate for Use as a Negative Electrode in Li-Ion Batteries, Journal of Materials Chemistry, 21 (5), 1615-1620 (2011).
Wang, W. et al., A New Redox Flow Battery Using Fe/V Redox Couples in Chloride Supporting Electrolyte, Energy & Environmental Science, 4 (10), 4068-4073 (2011).
Weber, A.Z. et al., Redox Flow Batteries: A Review, Journal of Applied Electrochemistry, 41 (10) 1137-1164 (2011).
Yang, Z. et al., Electrochemical Energy Storage for Greed Grid. Chemical Reviews, 111 (5), 3577-3613 (2011).
Yamamura, T. et al., Electrochemical Investigation of Uranium β-diketonates for All-Uranium Redox Flow Battery, Electrochimica Acta 48, 43-50 (2002).

\* cited by examiner

AQUEOUS PYRIDINIUM CATION-BASED REDOX FLOW BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to redox flow batteries. More particularly, this invention relates to aqueous redox flow batteries utilizing pyridinium cation-based redox materials.

BACKGROUND OF THE INVENTION

Low-cost, scalable energy storage systems are needed to improve the energy efficiency of the electrical grid (e.g., load-leveling, frequency regulation) and to facilitate the large-scale penetration of renewable energy resources (e.g., wind, solar). While alternative energy technologies exist, they cannot be directly connected to the grid because of their variable output. Electrochemical energy storage may provide the best combination of efficiency, cost, and flexibility to enable these applications. Of particular interest are redox flow batteries, which are rechargeable electrochemical energy storage devices that utilize the oxidation and reduction of two soluble electroactive species for charging (absorbing energy) and discharging (delivering energy). Unlike conventional secondary batteries, the energy-bearing species are not stored within an electrode structure but in separate liquid reservoirs and pumped to and from the power converting device when energy is being transferred. Because of this key difference, flow battery systems can be more durable than conventional battery systems as electrode reactions are not accompanied by morphological changes due to the insertion or removal of the active species and can be more scalable than conventional battery systems as the energy capacity may be easily and inexpensively modulated by varying the reservoir volume or the species concentration, without sacrificing power density. Thus, while flow batteries may not compete with compact lithium (Li)-ion batteries for portable applications (e.g., cell phones, laptops) due to lower overall energy densities, they are well-suited for large-scale stationary applications.

Since their inception in the 1960s, a large number of aqueous redox flow batteries have been developed including iron-chromium, bromine-polysulfide, vanadium-bromine, and all-vanadium systems. Several aqueous hybrid systems also have been developed, where one or both electrode reactions are a deposition/dissolution process, such as zinc-bromine and soluble lead-acid systems.

All current aqueous flow battery designs have functional or cost-performance limitations that hamper large scale adoption of this technology. Thus, there is an ongoing need for new redox flow batteries. The present invention addresses this need by providing an aqueous redox flow battery that utilizes a pyridinium cation-based electrolyte for the negative electrode.

SUMMARY OF THE INVENTION

The present invention provides an aqueous redox flow battery comprising a negative electrode (which functions as a current collector) immersed in a first aqueous electrolyte (also referred to herein as a "negative electrolyte" or "anolyte"), a positive electrode (which also functions as a current collector) immersed in a second aqueous electrolyte (also referred to herein as a "positive electrolyte" or "catholyte"), and a cation-permeable separator (e.g., a membrane or other cation-permeable material) partitioning the negative electrode/anolyte from the positive electrode/catholyte. During charging and discharging, the electrolytes are circulated over their respective electrodes, while cations from the electrolyte salt shuttle between the two electrolytes to balance the charges that develop as a result of oxidation and reduction of redox reactant components in the electrolytes.

The anolyte and the catholyte both comprise a redox reactant and an electrolyte salt (i.e., a single salt or a combination of two or more different salts). The redox reactant of the catholyte is selected to have a higher redox potential than the redox reactant of the anolyte.

The anolyte of the redox flow batteries described herein includes a redox reactant (also referred to herein as the "negative redox reactant") which is a pyridinium compound comprising a cation of Formula (I) and one or more counterions:

wherein Z is a group of Formula (i):

or H.

Each $R^1$ and $R^4$ independently is alkyl (e.g., a $C_1$-$C_6$ alkyl, such as methyl ethyl, propyl, isopropyl, butyl, pentyl, hexyl, and the like), substituted-alkyl (e.g., an alkyl group bearing one or more substituent such as halogen, nitro, amino, alkoxy, aryloxy, amido, hydroxyl, sulfonyl, carboxylic acid, carboxyalkyl, carbonylalkyl, and the like), cycloalkyl (e.g., cyclopentyl, cyclohexyl, and the like), substituted-cycloalkyl (e.g., a cycloalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), heterocycloalkyl (e.g., tetrahydrofuranyl, piperidinyl, piperazinyl, and the like), substituted-heterocycloalkyl (e.g., a heterocycloalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), aryl (e.g., phenyl, naphthyl, and the like), substituted-aryl (e.g., an aryl group bearing one or more substituent such as alkyl, halogen, nitro, amino, alkoxy, aryloxy, amido, hydroxyl, sulfonyl, carboxylic acid, carboxyalkyl, carbonylalkyl, and the like), arylalkyl (e.g., benzyl, phenylethyl, and the like), substituted-arylalkyl (e.g., an arylalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), heteroaryl (e.g., pyridyl, imidazolyl, quinolinyl, furanyl, thiofuranyl, and the like), and substituted-heteroaryl (e.g., a heteroaryl group bearing one or more substituent such as alkyl, halogen, nitro, amino, alkoxy, aryloxy, amido, hydroxyl, sulfonyl, carboxylic acid, carboxyalkyl, carbonylalkyl, and the like). Alternatively, $R^1$ and $R^4$ together are a bridging $C_1$ to $C_3$ alkylene group (e.g., —($CH_2$)x-, wherein x is 1, 2, or 3) or an alkyl-substituted bridging $C_1$ to $C_3$ alkylene group (e.g., a bridging $C_1$ to $C_3$ alkylene group substituted by one or more alkyl substituents (e.g., $C_1$ to $C_3$ alkyl) on one or more carbon atoms of the alkylene group).

Each $R^2$, $R^3$, $R^5$, and $R^6$ independently is H, —C(=Y)-E, alkyl (e.g., a $C_1$-$C_6$ alkyl, such as methyl ethyl, propyl, isopropyl, butyl, pentyl, hexyl, and the like), substituted-alkyl (e.g., an alkyl group bearing one or more substituent such as halogen, nitro, amino, alkoxy, aryloxy, amido, hydroxyl, sulfonyl, carboxylic acid, carboxyalkyl, carbonylalkyl, and the like), cycloalkyl (e.g., cyclopentyl, cyclohexyl, and the like), substituted-cycloalkyl (e.g., a cycloalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), heterocycloalkyl (e.g., tetrahydrofuranyl, piperidinyl, piperazinyl, and the like), substituted-heterocycloalkyl (e.g., a heterocycloalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), aryl (e.g., phenyl, naphthyl, and the like), substituted-aryl (e.g., an aryl group bearing one or more substituent such as alkyl, halogen, nitro, amino, alkoxy, aryloxy, amido, hydroxyl, sulfonyl, carboxylic acid, carboxyalkyl, carbonylalkyl, and the like), arylalkyl (e.g., benzyl, phenylethyl, and the like), substituted-arylalkyl (e.g., an arylalkyl group bearing one or more substituent such as alkyl, halogen, nitro, amino, alkoxy, aryloxy, amido, hydroxyl, sulfonyl, carboxylic acid, carboxyalkyl, carbonylalkyl, and the like), heteroaryl (e.g., pyridyl, imidazolyl, quinolinyl, furanyl, thiofuranyl, and the like), and substituted-heteroaryl (e.g., a heteroaryl group bearing one or more substituent such as alkyl, halogen, nitro, amino, alkoxy, aryloxy, amido, hydroxyl, sulfonyl, carboxylic acid, carboxyalkyl, carbonylalkyl, and the like). Y can be O or S; and E can be alkyl, substituted-alkyl, cycloalkyl, substituted-cycloalkyl, heterocycloalkyl, substituted-heterocycloalkyl, aryl, substituted-aryl, heteroaryl, or substituted-heteroaryl, wherein the aforementioned substituted groups can comprise one or more substituent such as alkyl, halogen, nitro, amino, alkoxy, aryloxy, amido, hydroxyl, sulfonyl, carboxylic acid, carboxyalkyl, carbonylalkyl, and the like.

In some embodiments, the negative redox reactant comprises a bipyridinium cation of Formula (II) (i.e., a cation of Formula (I) in which z is a group of Formula (i)):

(II)

wherein the $R^1$, $R^2$, $R^3$, $R^4$, $R^5$, and $R^6$ of the negative redox reactant are each as defined for Formula (I), above.

In some embodiments, the negative redox reactant comprises a bipyridinium cation of Formula (III):

(III)

wherein $R^2$, $R^3$, $R^5$, and $R^6$ of the negative redox reactant are each as defined for Formula (I), above; n is 1, 2, or 3, and each of $R^7$ and $R^8$ is H or $C_1$ to $C_3$ alkyl. For example, compounds with a cation of Formula (III) include N,N'-(ethan-1,2-diyl)-2,2'-bipyridinedium dibromide (A); an N,N'-(ethan-1,2-diyl)-4,4'-dimethyl-2,2'-bipyridinedium dibromide (B); and an N,N'-(ethan-1,2-diyl)-5,5'-dimethyl-2,2'-bipyridinedium dibromide (C).

In yet other embodiments, the negative redox reactant comprises a cation selected from one or more of Formula (IV), (V), and (VI):

(IV)

(V)

(VI)

wherein the $R^1$ and $R^2$ of the negative redox reactant are each as defined for Formula (I); Y is O or S; and each of $Ar^1$, $Ar^2$, and $Ar^3$ is an aryl group (e.g., phenyl, naphthyl, and the like) or substituted aryl group (e.g., an aryl group an aryl group bearing one or more substituent such as alkyl, halogen, nitro, amino, alkoxy, aryloxy, amido, hydroxyl, sulfonyl, carboxylic acid, carboxyalkyl, carbonylalkyl, and the like).

In all of the embodiments described herein, the counterions of the negative redox reactant are selected from a monovalent anion such as halide ($F^-$, $Cl^-$, $Br^-$, $I^-$), nitrate, perchlorate, hexafluorophosphate, tetrafluoroborate, bisulfate, and the like; a divalent anion such as sulfate, biphosphate, and the like; and a trivalent anion such as phosphate, borate, and the like. Optionally, the counterions can comprise a combination of monovalent, divalent and/or trivalent anions.

The cation-permeable separator is adapted to allow cations from the electrolyte salt to cross the membrane to balance out charges in the anolyte and catholyte that develop during the charging and discharging of the battery.

The electrolyte salts can comprise, for example, alkali metal salts, alkaline earth salts, organic salts, and the like. In some preferred embodiments, the electrolyte salts utilized in anolyte and catholyte are alkali metal salts (e.g., lithium salts such as lithium tetrafluoroborate or lithium hexafluorophosphate, or sodium salts).

Particularly advantageous redox reactants for the catholyte (also referred to herein as the "positive redox reactant") for use in the redox flow batteries described herein include, e.g., 2,2,6,6-tetramethylpiperidin-1-yl)oxyl ("TEMPO"; also known as 2,2,6,6-tetramethylpiperidin-1-yl)oxidanyl); 4-hydroxy-2,2,6,6-tetramethylpiperidin-1-yl)oxyl (4-hydroxy-TEMPO); 4-methoxy-2,2,6,6-tetramethylpiperidin-1-yl)oxyl (4-methoxy-TEMPO); and the like. Other examples of suitable positive redox materials include, e.g., metal complexes, such as iron, cobalt, vanadium, cerium, chromium or ruthenium complexed with various ligands (e.g., bipyridine, ethylenediaminetetraacetate (EDTA), phenanthroline, triethanolamine, diethylenetriaminepentaacetic acid (DTPA), acetylacetonate, and the like), bromine, iodine, ferricyanide ion, cyclopropenium salts, and water-soluble derivatives (e.g., carboxy derivatives and the like) of ferrocene, thiazine, quinone, phenothiazine, dimethoxybenzene, and the like.

DETAILED DESCRIPTION OF THE PREFERRED EMBODIMENTS

The present invention provides aqueous redox flow batteries. In some preferred embodiments, the flow battery comprises, consists essentially of, or consists of a negative electrode immersed in an anolyte, a positive electrode immersed in a catholyte, and a cation-permeable separator to allow cations to shuttle between the anolyte and the catholyte during charging and discharging. The negative electrode and positive electrode each act as current collectors.

The anolyte and catholyte each comprises, consists essentially of, or consists of an electrolyte salt and a redox reactant in an aqueous solvent. The redox reactant of the catholyte is selected to have a higher redox potential than the redox reactant of the anolyte. The cation components of the electrolyte salts shuttle between the anolyte and the catholyte through the cation-permeable separator to balance charges that develop during the oxidation and reduction of the redox reactants.

The electrolyte salt components of the anolyte and catholyte can be any electrochemically stable salt. The electrolytes can include a single salt or a combination of two or more salts. The cation component of the salt can be any monovalent (e.g., $Li^+$, $Na^+$, $Ag^+$, $Cu^+$, $NH_4^+$, and the like) or multivalent cation (e.g., $Mg^{2+}$, $Ca^{2+}$, $Cu^{2+}$, $Zn^{2+}$, and the like). In some preferred embodiments, the cation comprises an alkali metal ion, an alkaline earth metal ion, and/or an organic cation. Non-limiting examples of alkali metal cations include lithium and sodium. Non-limiting examples of alkaline earth metal ions include magnesium and calcium. Non-limiting examples of organic cations include tetraalkyl ammonium ions. The anionic component of the electrolyte salts can be any anion suitable for use in aqueous electrolytes for lithium or sodium ion-type batteries. Some non-limiting examples of suitable anionic components of the alkali metal salts include tetrafluoroborate ion ($BF_4^-$), hexafluorophosphate ion ($PF_6^-$), perchlorate ion ($ClO_4^-$), hexafluoroarsenate ion ($AsF_6^-$), trifluoromethanesulfonate ("triflate" or $CF_3SO_3^-$) ion, bis(perfluoroethanesulfonyl) imide (BETI) ion ($N(SO_2CF_2CF_3)^{2-}$), bis(oxalato)borate (BOB) ion ($B(C_2O_4)^{2-}$), and a halogen-substituted borane ($B_{12}X_nH_{(12-n)}^{2-}$; X=halogen) ion. In some embodiments, bis(trifluoromethanesulfonyl)imide (TFSI) ion ($N(SO_2CF_3)_2^{3-}$) can be utilized as the anion component of the electrolyte salt in the catholyte. The electrolyte salts of the anolyte and catholyte can be different materials or can be composed of the same material or materials. Non-limiting examples of some preferred salts include, e.g., $LiBF_4$, $LiPF_6$, lithium triflate, $NaBF_4$, $NaPF_6$, and sodium triflate.

The negative electrode of the battery is positioned within a negative electrolyte chamber ("NE chamber") that contains the negative electrolyte (i.e., anolyte). The NE chamber is defined by a first housing or enclosure. The NE chamber is adapted to communicate with a first negative electrolyte reservoir ("NE reservoir") and a second NE reservoir (e.g., via openings, valves, tubing, and the like to connect the interior of the housing/enclosure with the interior of the reservoirs). The first NE reservoir, the NE chamber, and the second NE reservoir together define a negative electrolyte circulation pathway. A pump is operably positioned within the negative electrolyte circulation pathway to facilitate circulation of the negative electrolyte back and forth between the first NE reservoir and the second NE reservoir over the negative electrode. The pump can be positioned in any convenient location in the negative electrolyte flow pathway (e.g., between the first NE reservoir and the NE chamber, between the second NE reservoir and the NE chamber, or integral with a portion of the NE chamber or NE reservoirs). The negative electrode can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrode can be porous, fluted, or smooth.

The positive electrode of the battery is positioned within a positive electrolyte chamber ("PE chamber"), which contains the positive electrolyte (i.e., catholyte). The PE chamber is defined by a second housing or enclosure. The PE chamber is adapted to communicate with a first positive electrolyte reservoir ("PE reservoir") and a second PE reservoir (e.g., via openings, valves, tubing, and the like to connect the interior of the housing/enclosure with the interior of the reservoirs). The first PE reservoir, the PE chamber, and the second PE reservoir together define a positive electrolyte circulation pathway. A pump is operably positioned within the positive electrolyte circulation pathway to facilitate circulation of the positive electrolyte back and forth between the first PE reservoir and the second PE reservoir over the positive electrode. The pump can be positioned in any convenient location in the positive electrolyte flow pathway (e.g., between the first PE reservoir and the PE chamber, between the second PE reservoir and the PE chamber, or integral with a portion of the PE chamber or PE reservoirs). The positive electrode can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrode can be porous, fluted, or smooth.

Pumps suitable for use in the flow batteries described herein include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump will be dependent on the chemical resistance of the pump to the electrolyte components in contact therewith (i.e., materials compatibility).

A cation-permeable separator is situated between the NE chamber and the PE chamber. The separator is adapted to allow cations to flow back and forth between the negative and positive electrolytes upon charging and discharging of the battery. The separator can be, for example, a cation-permeable membrane, sheet, panel, or film that is permeable to the cations of the electrolytes. In some embodiments, the separator is at least partially impermeable to the redox components of the electrolytes, although this is not an absolute requirement for the batteries of the present invention.

In some embodiments, the first and second housings or enclosures for the electrodes are integral with one another, and the cation-permeable separator is mounted as an internal partition separating the NE chamber from the PE chamber. In other embodiments, the first and second housings can be separate components that include perforations or openings that contact the separator, such that cations can flow between the NE chamber and the PE chamber, optionally along with some of the solvent and or redox component, and the separate housings are sealed, e.g. by gaskets, around the partition.

Non-limiting examples of suitable separator materials include, NAFION® type ion exchange membranes (sulfonated tetrafluoroethylene-based fluoropolymer-copolymers), other porous polymeric materials such as, for example, sulfonated poly(ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites. Alternatively, the separator can be an interface between immiscible liquids. In such case, a porous film, panel, or mesh might be included to aid in maintaining separation between the liquids (e.g., as a physical support or guide to aid in maintaining laminar flow at the interface).

During charging of the battery, an electric potential is applied to the negative and positive electrodes, while simultaneously pumping the negative electrolyte (anolyte) over the negative electrode from the first NE reservoir to the second NE reservoir, and pumping the positive electrolyte (catholyte) over the positive electrode from the first PE reservoir to the second PE reservoir. Cations flow across the cation-permeable separator to balance the charges. The negative redox reactant is reduced and stored in the second NE reservoir, while the positive redox reactant is oxidized and stored in the second PE reservoir. In this way, energy can be stored by charging the battery from an energy source during off-peak usage periods.

During discharge, the electrodes are placed in a circuit (e.g., with a power grid) and the direction of electrolyte flow is reversed, with the stored reduced negative redox reactant being pumped over the negative electrode back into the first NE reservoir, and the stored oxidized positive redox reactant being pumped over the positive electrode back into the first PE reservoir. Cations again flow across the cation-permeable separator (in the opposite direction) to balance the charges. The energy stored in the system can thus be directly used to perform work or can be transferred back into the power grid during peak usage periods to supplement the power supply. An AC/DC converter can be used to facilitate transfer of energy to and from an AC power grid.

In some embodiments, the redox reactant component of the negative electrolyte comprises a cation of Formula (I) (e.g., a compound of Formula (II), (III), (IV), (V), and/or (VI)), as described above, and one or more counterions, such monovalent anions (e.g., halide ($F^-$, $Cl^-$, $Br^-$, $I^-$), nitrate, perchlorate, hexafluorophosphate, tetrafluoroborate, bisulfate, and the like); divalent anions (e.g., sulfate, biphosphate, and the like); and/or trivalent anions (e.g., phosphate, borate, and the like).

Non-limiting, exemplary redox reactants comprising cations of Formula (III) include, e.g., compounds A, B, and C shown below.

Pyridinium compounds are well known in the chemical arts and can be prepared by a number of well-known methods. Typically, a neutral pyridine compound is reacted with an organic halide (e.g., an alkyl halide) or a similar reactive compound to form the pyridinium cation by reaction with the pyridine nitrogen. For example, bipyridinium dibromide compound (A) can be prepared by reaction of 2,2'-bipyridine (also known as 2,2'-bipyridyl) with ethylene dibromide in 95% yield, as illustrated below.

The redox reactant component of the positive electrolyte (the "positive redox reactant") is a redox reactive material having a redox potential greater than the redox potential of redox reactant of the negative electrolyte, e.g., the positive redox reactant has a higher redox potential than the cation of Formula (I) in the anolyte. In some embodiments, the redox reactant of the positive redox reactant comprises TEMPO, 4-hydroxy-TEMPO), 4-methoxy-TEMPO, and the like. In other embodiments, the positive redox material comprises, e.g., a metal complex, such as iron, cobalt, vanadium, cerium, chromium or ruthenium complexed with a ligand (e.g., bipyridine, ethylenediaminetetraacetate (EDTA), phenanthroline, triethanolamine, diethylenetriaminepentaacetic acid (DTPA), acetylacetonate, and the like), bromine, iodine, ferricyanide ion, cyclopropenium salts, and water-soluble derivatives (e.g., carboxy derivatives and the like) of ferrocene, thiazine, quinone, phenothiazine, dimethoxybenzene, and the like.

Figure 1:
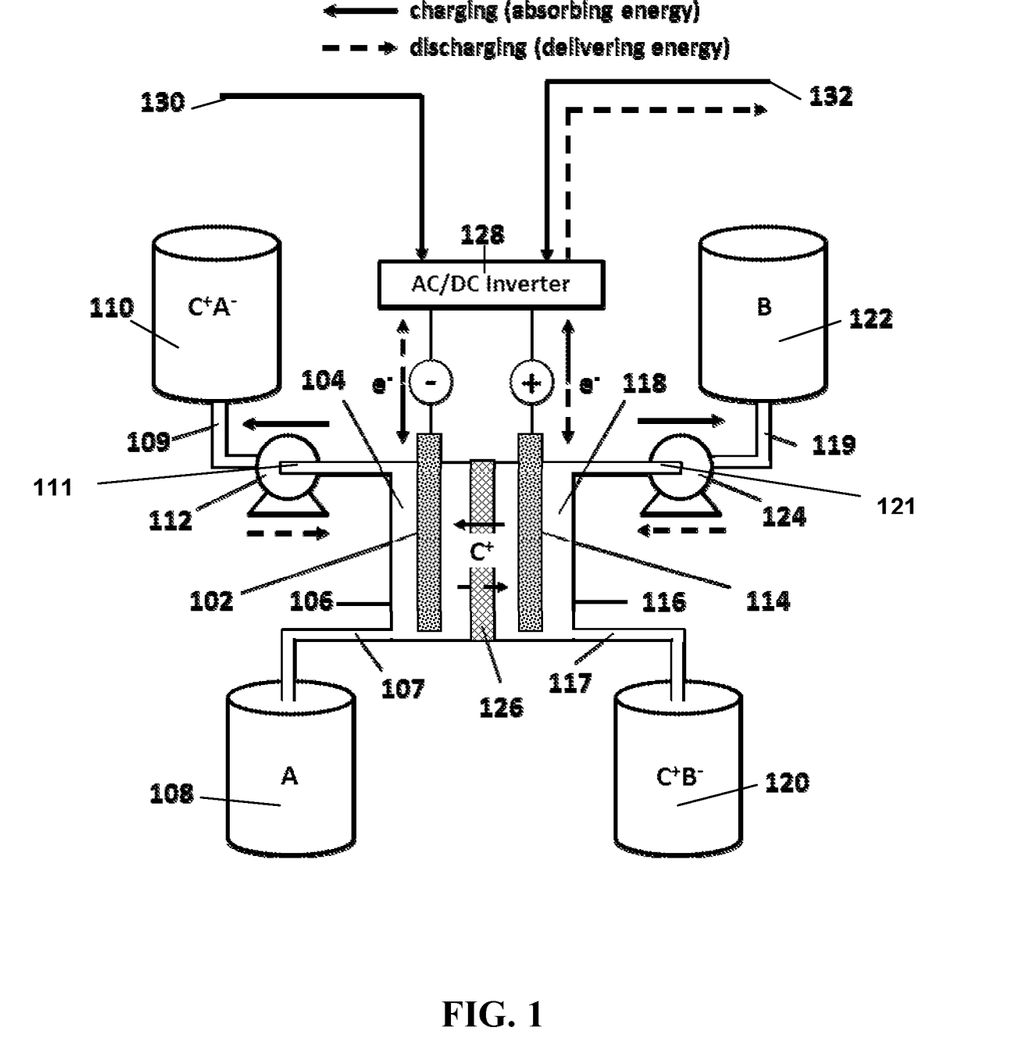
FIG. 1 provides a schematic illustration of an exemplary redox flow battery of the invention suitable for large-scale electrochemical energy storage. Species A and B represent generic negative and positive redox reactant electrode materials, respectively. Species $C^+$ represents a generic cation, which shuttles across a separator to maintain electroneutrality.

FIG. 1 schematically illustrates an aqueous redox flow battery of the present invention. The redox flow battery comprises negative electrode 102 within negative electrolyte chamber (NE chamber) 104, defined by housing 106. First negative electrolyte reservoir (NE reservoir) 108 is in fluid-flow communication with NE chamber 104 via pipe 107. Second NE reservoir 110 is operably connected to pump 112 via pipe 109, while pump 112 also is operably connected to NE chamber 104 via pipe 111. Pump 112 is adapted to facilitate transfer of negative electrolyte back and forth between first NE reservoir 108 to second NE reservoir 110 through NE chamber 104, such that the flowing electrolyte contacts negative electrode 102. The battery also includes a positive electrode 114 within positive electrolyte chamber (PE chamber) 118, defined by housing 116. First positive electrolyte reservoir (PE reservoir) 120 is in fluid-flow communication with PE chamber 118 via pipe 117. Second PE reservoir 122 is operably connected to pump 124 via pipe 119, while pump 124 also is operably connected to PE chamber 118 via pipe 121. Pump 124 is adapted to facilitate transfer of positive electrolyte back and forth between first PE reservoir 120 to second PE reservoir 122 through PE chamber 118, such that the flowing electrolyte contacts positive electrode 114. Cation-permeable separator 126 separates NE chamber 104 from PE chamber 118, and allows passage of cations ($C^+$) back and forth between the positive and negative electrolytes to balance out charges that form during oxidation and reduction of materials within the electrolytes.

During charging of the redox flow battery, an electric potential is applied to the negative electrode 102 and positive electrode 114, e.g., from an energy source 130 via AC/DC converter 128, while simultaneously pumping the negative electrolyte over negative electrode 102 from first NE reservoir 108 to second NE reservoir 110, and simultaneously pumping the positive electrolyte over the positive electrode from the first PE reservoir 120 to the second PE reservoir 122. Cations ($C^+$) pass through cation-permeable separator 126 to balance the charges. A negative redox reactant material (represented by $A/A^-C^+$) and a positive redox reactant material (represented by $B/B^-C^+$) in the electrolytes undergo redox reactions upon contact with the electrodes such that the reduced form of A is stored in second NE reservoir 110, while the oxidized form of B is stored in the second PE reservoir 122. In this way, energy can be stored by charging the battery from energy source 130 during off-peak usage periods.

During discharge, the electrodes are placed in a circuit (e.g., with a power grid 132) and the direction of electrolyte flow is reversed, with the stored reduced negative electrolyte being pumped over negative electrode 102 back into first NE reservoir 108, and the stored oxidized positive electrolyte being pumped over positive electrode 114 back into first PE reservoir 120. Cations again transfer through cation-permeable separator 126 (in the opposite direction) to balance the charges resulting from redox reactions at the electrodes. The energy stored in the system during charging can thus be directly used to perform work or can be transferred into power grid 132 during peak usage periods to supplement the power supply. AC/DC converter 128 again can be used to facilitate transfer of energy to an AC power grid.

EXAMPLE 1

Preparation of Pyridinium Redox Reactants

N,N'-(ethan-1,2-diyl)-2,2'-bipyridinedium dibromide (A) can be prepared by reaction of 2,2'-bipyridine with ethylene dibromide (1,2-dibromoethane) in 95% yield, as illustrated below.

2,2'-bipyridine

A

A solution of 2,2'-bipyridyl (4.7 g, 30 mmol) in 1,2-dibromoethane (30 mL) was refluxed for 12 h, during which a precipitate was accumulated. The reaction was cooled to room temperature. The solid was filtered off and washed with acetone, hexanes, and then dried under vacuum to afford A (6.5 g, 95%) as a yellow solid. $^1$H NMR (300 MHz, D$_2$O) δ 9.14 (d, J=5.8 Hz, 2H), 8.91 (d, J=8.2 Hz, 2H), 8.82 (t, J=8.0 Hz, 2H), 8.29 (dd, J=9.1, 4.5 Hz, 2H), 5.29 (s, 4H).; $^{13}$C NMR (75 MHz, D$_2$O) δ 148.3, 147.1, 139.7, 130.7, 128.5, 52.4.

Bipyridinium compounds N,N'-(ethan-1,2-diyl)-4,4'-dimethyl-2,2'-bipyridinedium dibromide (B), and N,N'-(ethan-1,2-diyl)-5,5'-dimethyl-2,2'-bipyridinedium dibromide (C) were prepared from the corresponding methyl-substituted bipyridine compounds by reaction with ethylene dibromide following the same general procedure used to prepare the non-methylated compound (A).

B

C

EXAMPLE 2

Electrochemical Evaluation of Pyridinium Redox Reactants

Figure 2:
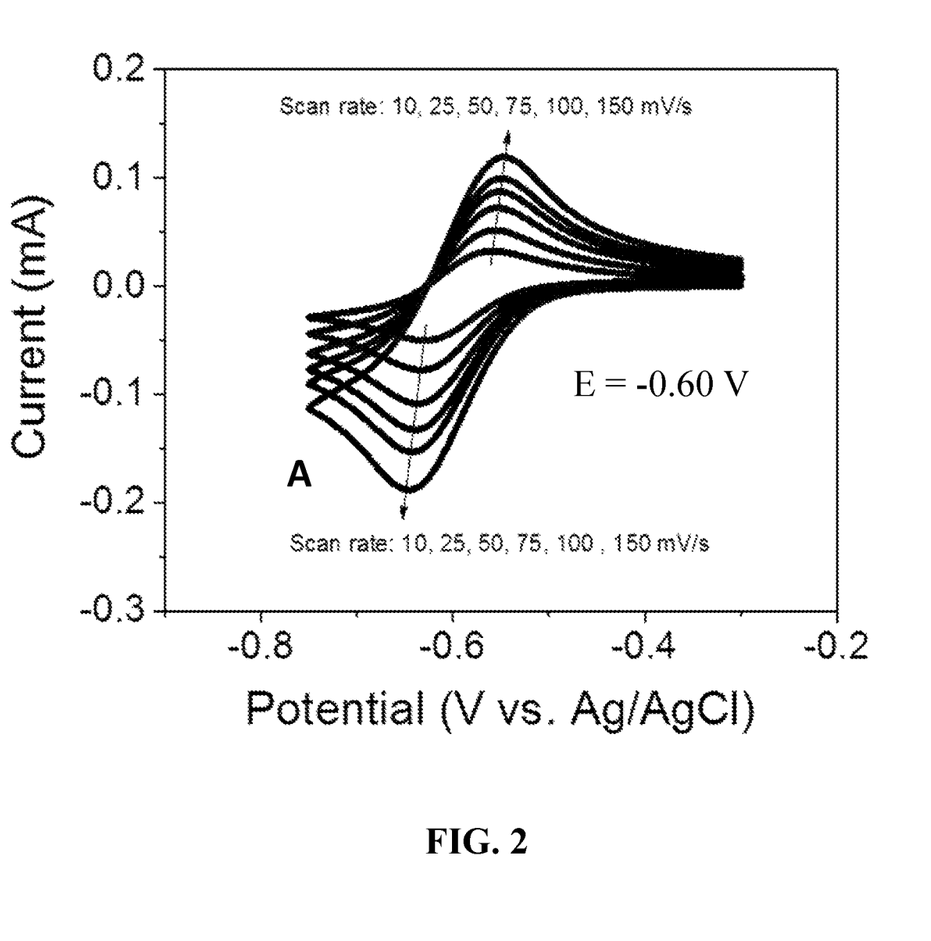
FIG. 2 shows cyclic voltammograms of 10 mM N,N'-(ethan-1,2-diyl)-2,2'-bipyridinedium dibromide (A) in 0.5 M aqueous NaCl solution using a glassy carbon-platinum-silver/silver chloride three-electrode apparatus ("GC|Pt|Ag/AgCl") at various scan rates given in mV/s in the insets.
Figure 3:
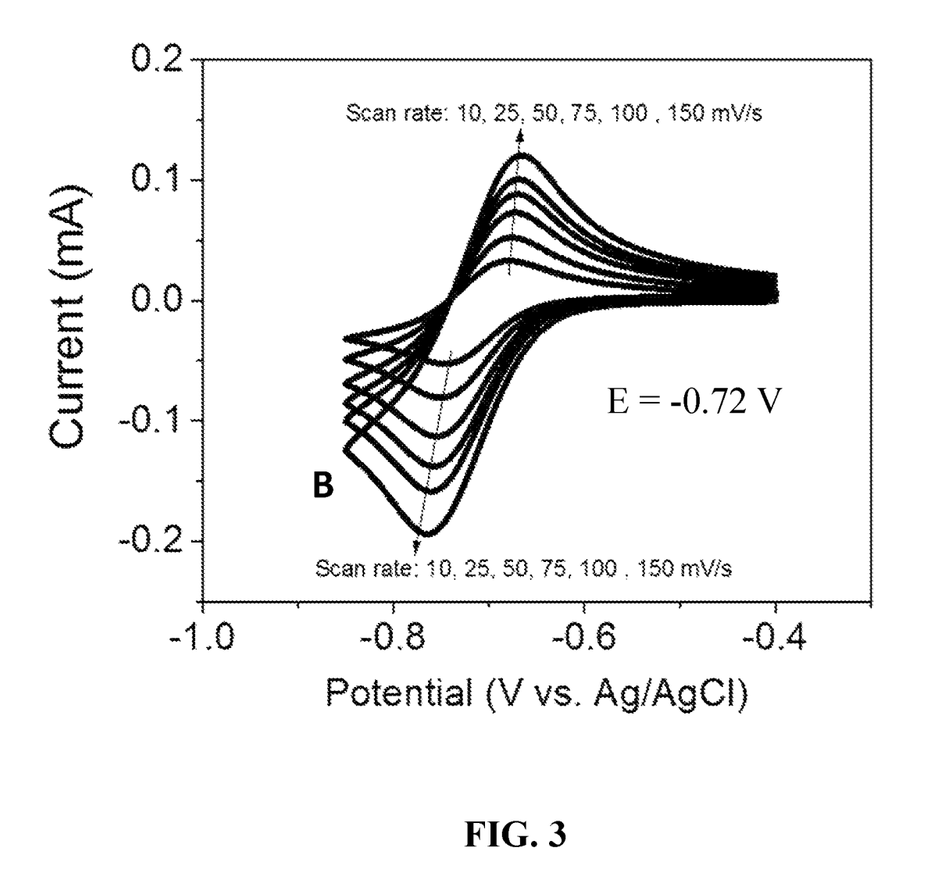
FIG. 3 shows cyclic voltammograms of 10 mM N,N'-(ethan-1,2-diyl)-4,4'-dimethyl-2,2'-bipyridinedium dibromide (B) in 0.5 M aqueous NaCl solution using a GC|Pt|Ag/AgCl three-electrode apparatus at various scan rates given in mV/s in the insets.
Figure 4:
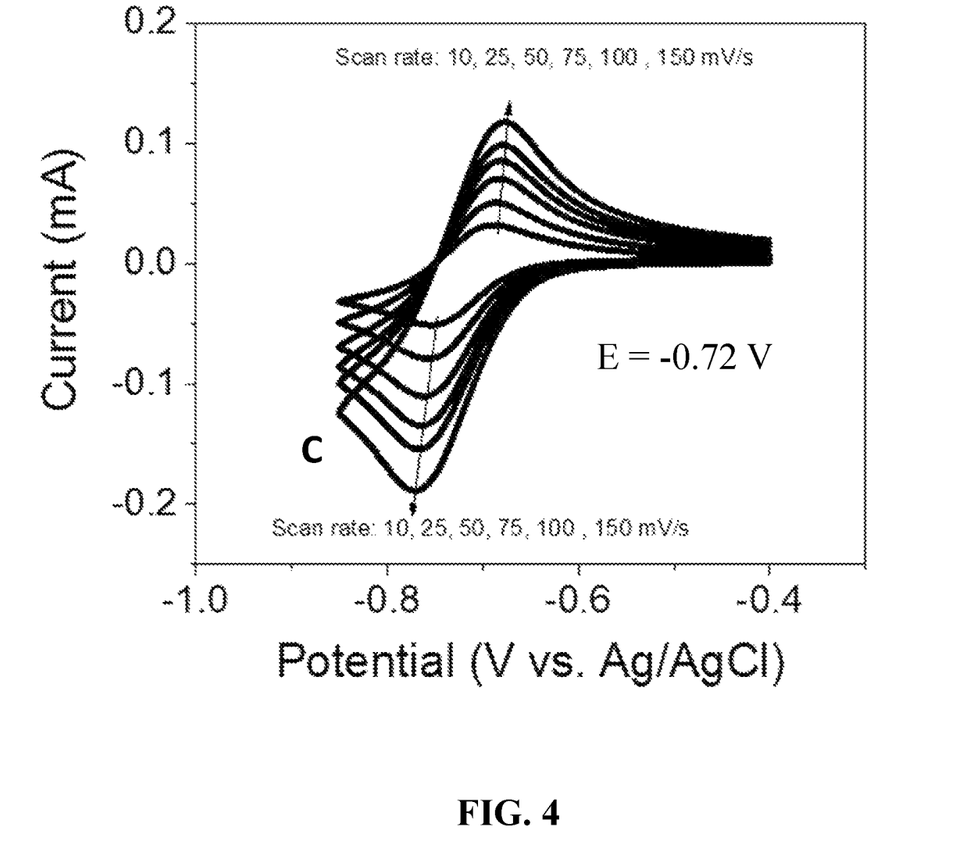
FIG. 4 shows cyclic voltammograms of 10 mM N,N'-(ethan-1,2-diyl)-5,5'-dimethyl-2,2'-bipyridinedium dibromide (C) in 0.5 M aqueous NaCl solution using a GC|Pt|Ag/AgCl three-electrode apparatus at various scan rates given in mV/s in the insets.

The electrochemical properties of bipyridinium compounds (A), (B), and (C) were evaluated using cyclic voltammetry in a GC|Pt|Ag/AgCl three-electrode cell containing a 10 mM concentration of the redox reactant compound in 0.5 M aqueous NaCl as the supporting electrolyte. Compounds (A), (B), and (C) exhibited well-defined, reversible redox waves with redox potentials of −0.60 V, −0.72V and −0.72 V, respectively, versus Ag/AgCl (see FIGS. 2, 3, and 4). These materials had surprisingly good properties for use as anolyte redox materials, including reduction potentials that are about 70 mV lower than that of viologen (a commonly used anolyte reactant in flow batteries), good solubility in water (typically greater than 2 M), and good electrochemical stability. In addition, compounds such as (A), (B), and (C) can be readily synthesized in just one step from commercially available starting materials in high yields (up to 100% atomic efficiency) and can be easily scaled up for industry application. All of these factors have a significant impact on the design of a practical, commercially viable redox flow battery. Compound (B), in particular, exhibited a desirably low redox potential, high solubility in water (2.6 M), and excellent electrochemical stability (less than 10% decay was observed after 1000 cycles). Coupling Compound (B) with 4-methoxy-TEMPO in a redox flow battery will provide a cell voltage of about 1.32 V, which is 70 mV higher than the known methyl viologen dichloride/4 hydroxy-TEMPO couple and approaching the cell voltage limit of the aqueous flow battery.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments of the invention in which an exclusive property or privilege is claimed are defined as follows:

1. An aqueous redox flow battery comprising a negative electrode immersed in an aqueous liquid negative electrolyte, a positive electrode immersed in an aqueous liquid positive electrolyte, and a cation-permeable separator between the negative and positive electrolytes;

the negative electrode being positioned within a negative electrolyte chamber ("NE chamber") defined by a first housing and containing the negative electrolyte, the NE chamber connecting with a first negative electrolyte reservoir ("NE reservoir") and a second NE reservoir such that the first NE reservoir, the NE chamber, and the second NE reservoir can be placed in fluid-flow communication and collectively define a negative electrolyte circulation pathway; a first pump being operably positioned within the negative electrolyte circulation pathway to circulate the negative electrolyte back and forth between the first NE reservoir and the second NE reservoir over the negative electrode;

the positive electrode being positioned within a positive electrolyte chamber ("PE chamber") defined by a second housing and containing the positive electrolyte, the PE chamber connecting with a first positive electrolyte reservoir ("PE reservoir") and a second PE reservoir such that the first PE reservoir, the PE chamber, and the second PE reservoir can be placed in fluid-flow communication and collectively define a positive electrolyte circulation pathway; a second pump being positioned within the positive electrolyte circulation pathway to circulate the positive electrolyte back and forth between the first PE reservoir and the second PE reservoir over the positive electrode;

the negative and positive electrolytes each independently comprising an electrolyte salt, a redox reactant, and an aqueous solvent; and the NE chamber and the PE chamber being separated from one another by the cation-permeable separator, such that cations from the electrolyte salt can flow back and forth between the NE chamber and the PE chamber to balance charges resulting from oxidation and reduction of the redox reactants during charging and discharging of the battery;

wherein the redox reactant of the positive electrolyte has a higher redox potential than the redox reactant of the negative electrolyte; and wherein the redox reactant of the negative electrolyte comprises a cation of Formula (IV):

(IV)

wherein:

$R^1$ is selected from alkyl, substituted-alkyl, cycloalkyl, substituted-cycloalkyl, heterocycloalkyl, substituted-heterocycloalkyl, aryl, substituted-aryl, arylalkyl, substituted-arylalkyl, heteroaryl, and substituted-heteroaryl;

$R^2$ is selected from H, —C(=Y)-E, alkyl, substituted-alkyl, cycloalkyl, substituted-cycloalkyl, heterocycloalkyl, substituted-heterocycloalkyl, aryl, substituted-aryl, arylalkyl, substituted-arylalkyl, heteroaryl, and substituted-heteroaryl;

each Y independently is O or S;

E is selected from alkyl, substituted-alkyl, cycloalkyl, substituted-cycloalkyl, heterocycloalkyl, substituted-heterocycloalkyl, aryl, substituted-aryl, heteroaryl, and substituted-heteroaryl; and $Ar^1$ is an aryl group or substituted aryl group.

2. The aqueous redox flow battery of claim 1, wherein the redox reactant of the positive electrolyte comprises 2,2,6,6-tetramethylpiperidin-1-yl)oxyl (TEMPO); 4-hydroxy-2,2,6,6-tetramethylpiperidin-1-yl)oxyl(4-hydroxy-TEMPO); or 4-methoxy-2,2,6,6-tetramethylpiperidin-1-yl)oxyl(4-methoxy-TEMPO).

3. The aqueous redox flow battery of claim 1, wherein the cations of the electrolyte salts are selected from $Li^+$ and $Na^+$.

4. The aqueous redox flow battery of claim 3, wherein the anions of the electrolyte salts are selected from the group consisting of $BF_4^-$, $PF_6^-$, $ClO_4^-$, $AsF_6^-$, $CF_3SO_3^-$, $N(SO_2CF_3)_2^-$, $N(SO_2CF_2CF_3)^{2-}$, $B(C_2O_4)^{2-}$, and $B_{12}X_nH_{(12-n)}^{2-}$, wherein X=halogen.

5. The aqueous redox flow battery of claim 1, wherein one or more of the substituted-cycloalkyl, substituted-heterocycloalkyl, substituted-aryl, substituted-arylalkyl, and substituted-heteroaryl groups of $R^1$, $R^2$ or both $R^1$ and $R^2$ bears one or more substituent selected from alkyl, halogen, nitro, amino, alkoxy, aryloxy, amido, hydroxyl, sulfonyl, carboxylic acid, carboxyalkyl, and carbonylalkyl.

6. The aqueous redox flow battery of claim 1, wherein the substituted-alkyl group of $R^1$, $R^2$ or both $R^1$ and $R^2$ bears one or more substituent selected from halogen, nitro, amino, alkoxy, aryloxy, amido, hydroxyl, sulfonyl, carboxylic acid, carboxyalkyl, and carbonylalkyl.

\* \* \* \* \*